United States Patent
Leconte et al.

(10) Patent No.: US 10,462,103 B2
(45) Date of Patent: Oct. 29, 2019

(54) HIGH ASSURANCE SECURITY GATEWAY INTERCONNECTING DIFFERENT DOMAINS

(71) Applicants: Airbus Operations (SAS), Toulouse (FR); Airbus Defence and Space GmbH, Ottobrunn (DE)

(72) Inventors: Bertrand Leconte, Toulouse (FR); Cristina Simache, Toulouse (FR); Michael Paulitsch, Ottobrunn (DE); Kevin Mueller, Munich (DE)

(73) Assignees: AIRBUS OPERATIONS SAS, Toulouse (FR); AIRBUS DEFENCE AND SPACE GMBH, Ottobrunn (DE)

( * ) Notice: Subject to any disclaimer, the term of this patent is extended or adjusted under 35 U.S.C. 154(b) by 177 days.

(21) Appl. No.: 14/638,467

(22) Filed: Mar. 4, 2015

(65) Prior Publication Data
US 2015/0256512 A1    Sep. 10, 2015

(30) Foreign Application Priority Data
Mar. 7, 2014   (EP) ..................... 14158361

(51) Int. Cl.
*H04L 29/06*   (2006.01)
(52) U.S. Cl.
CPC .......... *H04L 63/02* (2013.01); *H04L 63/0227* (2013.01); *H04L 63/10* (2013.01); *H04L 63/107* (2013.01)
(58) Field of Classification Search
None
See application file for complete search history.

(56) References Cited

U.S. PATENT DOCUMENTS

| 7,607,167 | B1 | 10/2009 | Johnson et al. | |
|---|---|---|---|---|
| 7,941,526 | B1 * | 5/2011 | Hope | H04L 41/069 709/224 |
| 8,891,546 | B1 * | 11/2014 | Frenkel | H04L 63/1441 370/419 |
| 10,218,715 | B2 * | 2/2019 | Thomson | H04L 63/0209 |

(Continued)

FOREIGN PATENT DOCUMENTS

| EP | 2428910 | 3/2012 |
|---|---|---|
| EP | 2677425 | 12/2013 |
| WO | WO2014114232 | * 1/2013 |

OTHER PUBLICATIONS

IP.com 1 (an additional version of WO2014114232 provided by Ip.com and included for reading clarity).*

(Continued)

*Primary Examiner* — Piotr Poltorak
(74) *Attorney, Agent, or Firm* — Greer, Burns & Crain, Ltd.

(57) ABSTRACT

A gateway having an architecture authorizing a bidirectional communication between applications located in different domains and presenting a high assurance level of protection. The gateway uses a virtualization platform and comprises a set of functional blocs configured to authorize secure bidirectional flow of data along two different paths between first and second domains, said set of functional blocs being decomposed into a plurality of elementarily evaluable components each one of which having a specified function and being adapted to communicate with other predefined elementarily evaluable components.

12 Claims, 4 Drawing Sheets

(56) References Cited

U.S. PATENT DOCUMENTS

| | | | | |
|---|---|---|---|---|
| 2002/0083331 A1* | 6/2002 | Krumel | H04L 29/06 726/3 |
| 2003/0117993 A1* | 6/2003 | Syvanne | H04L 63/02 370/349 |
| 2006/0156400 A1* | 7/2006 | Shevchenko | G06F 21/50 726/22 |
| 2006/0253908 A1* | 11/2006 | Yang | H04L 63/0254 726/24 |
| 2008/0104586 A1* | 5/2008 | Thorton | G06F 9/45533 718/1 |
| 2008/0259929 A1* | 10/2008 | Mraz | H04L 12/5601 370/395.1 |
| 2011/0125894 A1* | 5/2011 | Anderson | H04L 9/3213 709/224 |
| 2011/0154464 A1* | 6/2011 | Agarwal | H04L 63/0815 726/8 |
| 2011/0188499 A1* | 8/2011 | Wijnands | H04L 12/56 370/390 |
| 2012/0324449 A1* | 12/2012 | Huetter | G06F 9/5066 718/1 |
| 2013/0042297 A1* | 2/2013 | Kim | G06F 21/53 726/1 |
| 2014/0337407 A1* | 11/2014 | Mraz | H04L 67/42 709/203 |

OTHER PUBLICATIONS

IP.com2 (translation of the CN PUB 103944865 of CH App 201310023542).*
Ramasubramanian (Rahul Ramasubramanian, Exploring Virtualization Platforms for ARM-based Mobile Android Devices, North Caroline State University, 2011).*
European Search Report, dated Aug. 21, 2014.
"Mils-based information flow control in the avionic domain . . . ", Digital Avionics Systems Conference, Oct. 14, 2012.
"MILS-related information control in the avionic domain . . . ", Dependable systems and netoworks workshops, Jun. 25, 2012.

* cited by examiner

HIGH ASSURANCE SECURITY GATEWAY INTERCONNECTING DIFFERENT DOMAINS

CROSS-REFERENCES TO RELATED APPLICATIONS

This application claims the benefit of the European patent application No. 14158361.7 filed on Mar. 7, 2014, the entire disclosures of which are incorporated herein by way of reference.

BACKGROUND OF THE INVENTION

The present invention generally concerns a high assurance security gateway interconnecting different domains and particularly in embedded infrastructures.

In most industrial fields, it is usual to have different systems with different applications communicating with each other in order to achieve an assignment. Each application may be considered as a set of functions and each function is a piece of software contributing to execute a part of the task to be accomplished by the application. For example, many different types of equipment in a vehicle or an aircraft need to exchange data with each other through a communication system in order to accomplish the maneuvering of the vehicle or the aircraft. Each type of equipment may have a specific set of functions or applications with different levels of criticality depending on their importance. A specific level of security is associated to each application as a function of the criticality of that application. Therefore, it is important and practically useful to establish a mechanism that allows an efficient exchange of information between applications in domains having different security levels without compromising their security.

One solution would consist of physically separating the different applications by hosting each one on a different physical system and connecting them via a network channel. The data exchange via this network channel needs to be controlled by a control means for securing information exchange.

A computing resource of an embedded environment used to be barely enough to host one function. However nowadays, due to the current growing efficiency of computing resources, the trend is exactly the opposite and consists of putting several applications or functions on the same physical system in order to use the full computing power and memory storage capabilities offered by that system. This enables the avoidance of wasting unused resources and thus reduces the production costs as well as the overall weight of the system which is very important for an aircraft, a satellite or a vehicle. This architecture has however the disadvantage of facilitating the propagation of errors. Indeed, any design or implementation error on one part of the system may lead to failures impacting on other parts of the system. This difficulty is solved for example in the aircraft environment by existing IMA (Integrated Modular Avionics) architectures addressing design or implementation error propagation from one part of the system to another in regard to the safety perspective. Moreover, in recent years, virtualization techniques have been developed in order to take into account security aspects relative to malicious attempts. Thus, nowadays the trend is to host several applications on the same physical system by providing a good level of assurance for the strict runtime environment segregation between the different applications. One such security architecture is MILS (Multiple Independent Levels of Security) built upon strict segregation properties for the execution environments and strict communication paths. Indeed, MILS architecture enables a system to host several applications or functions with different or the same levels of security without any interference between these applications.

However, the problem remains of how to protect the security of several applications characterized by different security levels while authorizing the bidirectional information exchange between them. For example, if for one reason or another, a part of the system becomes malicious, it is needed to prevent the latter from trying to deliberately damage the other parts of the system.

There exist some security techniques that partly solve the problem of communication with different levels of security. One such a technique is the Bell-La Padula model which addresses confidentiality aspects. This model is based on a "no write down, no read up" strategy. In other words, a first domain with a high security level is not allowed to write or communicate any data to a second domain with a low security level but is allowed to read data from the latter. On the other hand, the second domain with a low security level is not allowed to read data from the first domain with a high security level but is authorized to write data into it.

Another known method is the Biba integrity model defining a set of access rules designed to ensure data integrity. This model is based on a "no read down, no write up" strategy. In other words, a first domain with a high security level is not allowed to read or use any data from a second domain with a low security level. On the other hand, the second domain is not allowed to write or communicate any data to the first domain with a higher security level.

It is clear that the above two models cannot be implemented simultaneously. Thus, in order to authorize a bidirectional communication between two domains respecting both models at the same time, complex application level proxies should be implemented. However, complex proxies are very difficult to analyze at high assurance levels.

Indeed, the difficulty in certifying complex proxies is reasoned by their software architecture, since they consolidate several functionalities and are implemented by a significant amount of software code (i.e., several hundreds of thousands lines of code). The Common Criteria standard provides a framework and guidance for the security certification of computer systems. This standard defines seven EALs (Evaluation Assurance Levels). EAL 7 provides the highest level of assurance but also requires formal modelling of the system under evaluation. Security evaluations presenting a level higher than EAL 4 are internationally not recognized. Thus, a system claiming high EAL levels requires multiple certifications from the different countries where the system is to be used.

The purpose of the present invention is therefore to propose a gateway and an efficient method for implementing the same, said gateway having an architecture which authorizes a bidirectional communication between applications located in different domains (that might have different security levels), presents a high assurance level of protection, efficiently uses hardware resources, is adapted to be used in an embedded environment, and allows an easier security certification without having the aforementioned shortcomings.

SUMMARY OF THE INVENTION

The present invention is defined by a gateway using a virtualization platform and adapted to interconnect different domains, said gateway comprising a set of functional blocs configured to authorize secure bidirectional flow of data along two different paths between first and second domains, said set of functional blocs being decomposed into a plurality of elementarily evaluable components (hereafter, called elementary components) each one of which having a specified function and being adapted to communicate with other predefined elementary components.

The gateway enables a bidirectional and highly secure communication along two different routes between applications located into two different domains and potentially having different security levels. In particular, the elementary components are configured to be small enough so as to be easily analyzable and thus protect the security of applications with a high assurance level. The basic security-enhancing property is that these elementary components can only interact among each other via well-defined gateway-internal communication paths, while all other unintended interference of those components among each other is forbidden.

The present invention also concerns an embedded infrastructure (for example, a computer) comprising said gateway according to the above characteristics.

In addition, the invention concerns an aircraft communication system comprising said gateway according to the above characteristics.

Moreover, the invention concerns a method for constructing a gateway using a virtualization platform (of MILS type for example) and adapted to interconnect different domains with different security levels, comprising the following steps:
- defining and analyzing a set of functional blocs configured to authorize secure bidirectional flow of data along two different paths between two different domains,
- decomposing said set of functional blocs in an iterative way into a plurality of elementarily evaluable components (hereafter, called elementary components), each elementary component having a specified function and being adapted to communicate with other predefined elementary components.

BRIEF DESCRIPTION OF THE DRAWINGS

Other characteristics and advantages of the invention will become apparent on reading preferred embodiments of the invention given with reference to the appended figures among which.

DETAILED DESCRIPTION OF THE PREFERRED EMBODIMENTS

The concept of the invention comprises decomposing the functions of a gateway into sufficiently small components that can be easily evaluated or analyzed.

Figure 1:
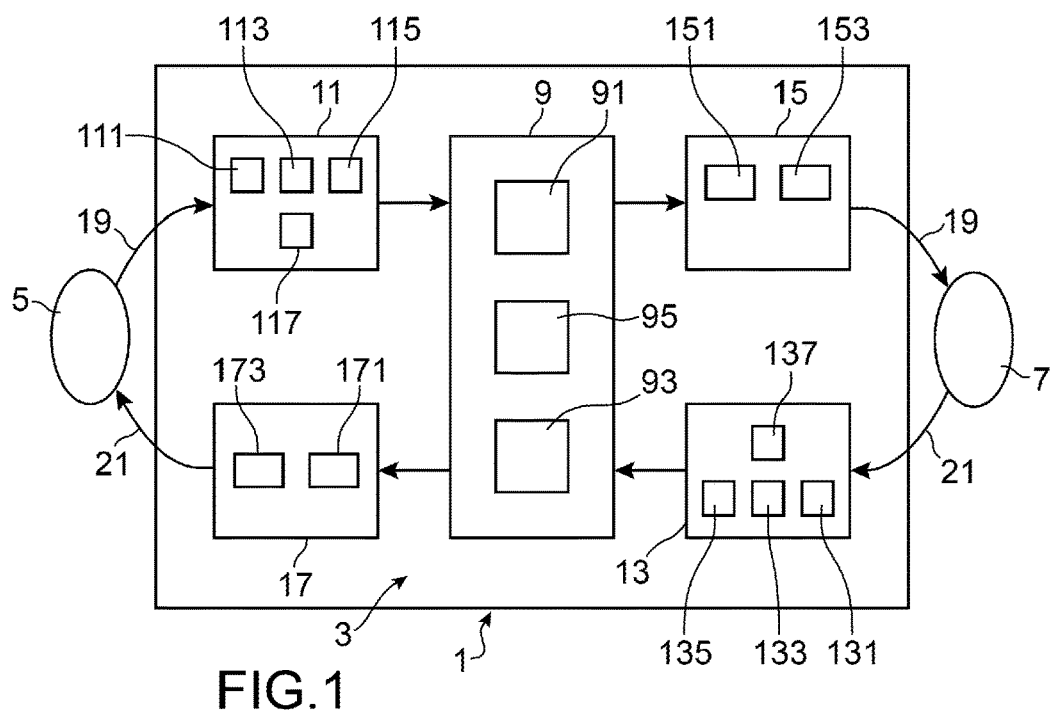
FIG. 1 schematically illustrates a gateway adapted to interconnect different domains potentially with different security levels according to the invention.

FIG. 1 schematically illustrates a gateway adapted to interconnect different domains potentially with different security levels according to the invention.

The gateway 1 uses a virtualization platform 3 of MILS type, and is designed to take advantage of strong segregation properties and specified communication channels of such a platform in order to host several functions simultaneously.

It is recalled that a virtualization platform 3, developed for high assurance needs, is based essentially on strict segregation and non-interference properties between the different functions. Indeed, a virtualization platform 3 offers the possibility of creating isolated runtime environments (generally called partitions) for each function. It also offers strong temporal and spatial segregation between the partitions (i.e. non-interference properties between hardware and software resources shared by the different functions). Moreover, it provides secure communication means between different partitions hosted by the platform 3 as well as secure communication means (for example, network interfaces) between one or more partitions of the platform 3 and the outside domains. A virtualization platform 3 can be built by using software and/or hardware virtualization techniques such as a MILS Separation Kernel or any other virtualization Operating System fulfilling the above properties. The hardware part of the platform 3 comprises as usual communicating buses (not shown) interconnecting one or more processing units (not shown), storage devices (not shown), and one or more (possibly virtualized) network interfaces (not shown) as well as a specific hardware module (not shown) for managing direct memory access such as an IOMMU (Input Output Management Memory Unit).

According to the invention, the gateway 1 is adapted to interconnect different domains 5, 7 with potentially different security levels. For simplicity reasons, the example of FIG. 1 shows a first domain 5 adapted to be communicating with a second domain 7 but of course, the first domain 5 can also communicate with a third domain (not shown) and the second domain 7 can equally communicate with a fourth domain (not shown), etc.

The gateway 1 comprises a set of functional blocs 9-17 configured to authorize secure bidirectional flow of data along two different paths 19, 21 of opposite directions between the first domain 5 and the second domain 7. The set of functional blocs 9-17 is decomposed into a plurality of elementarily evaluable components 91-173. By an elementarily evaluable component (hereafter called elementary component) is meant a sufficiently small component to be analyzable or evaluable. In other words, it means that its code complexity is so simple that the analysis of that component is easy to conduct by associating a model (for example an analytical model or a formal method) to a given implementation and prove its correctness with regard to the component specification. In particular, formal methods are appropriate for characterizing elementary components at a high assurance level. As an example, a component having less than approximately 8000 lines of code (LOC) of a high level language is considered as sufficiently small to be evaluable by formal methods. It is to be noted that the smaller the component is, the simpler and thus, the easier it is to prove the correct implementation of its function.

The required level of assurance (EAL) limits the size and thus the complexity of an elementary component. A higher assurance level (i.e., providing a higher assurance that a given function is implemented correctly) needs higher certification efforts and, thus, a smaller component would be more advantageous for handling affordable certification costs.

Moreover, each elementary component has a well specified or defined function (i.e., it knows exactly what to do in any situation). The elementary component is also adapted to communicate with other predefined elementary components. In other words, it has well defined interfaces for communicating with other well identified components to which it is authorized to do so.

Thus, according to the invention, the gateway 1 is decomposed into well defined, sufficiently small and evaluable elements or modules called elementary components 91-173.

Figure 2:
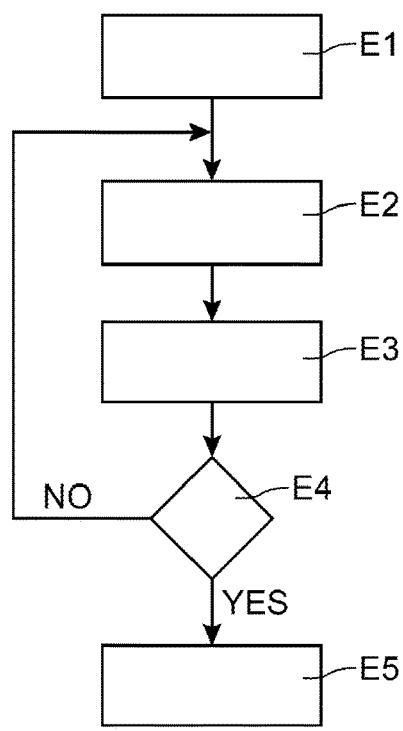
FIG. 2 is a flow chart illustrating a method for constructing a gateway according to the embodiment of FIG. 1.

FIG. 2 is a flow chart illustrating a method for constructing a gateway according to the embodiment of FIG. 1.

In step E1 the main functions of the gateway 1 are defined and analyzed. For example a set of functional blocs 11-17 are defined and analyzed in order to authorize secure bidirectional flow of data along two different paths 19, 21 between two different domains 5, 7. These functional blocs 11-17 are configured to run on a virtualization platform (for example of MILS type or any other platform that ensures strong segregation properties) and comprise receiving blocs 11, 13 adapted to receive data flow, transmitting blocs 15, 17 separated from the receiving blocs and adapted to transmit data flow, analyzing bloc 9 adapted for analyzing application-level protocol data flow security, etc.

Steps (E2-E4) concern an iterative decomposition of the set of functional blocs 11-17 into a plurality of elementarily evaluable components 111-173.

In particular, in step E2 each functional bloc is decomposed into smaller functional components having well defined functions. The functional components are adapted and allowed to communicate with each other according to well specified authorization rules.

For example, for a given protocol, a set of security rules to be implemented by a functional bloc is subdivided into several distinct subsets each one corresponding to a distinct functional component having only very few elements (i.e., one or two rules).

In step E3, the complexity of each functional component is determined. For example, the number of branches and/or the number of lines of code (LOC) are estimated for each component in order to determine whether the component is small enough to be analyzable according to the assurance level chosen for that component.

Step E4 is a stop criteria testing whether all functional components are elemental (i.e. small enough to be analyzable at the desired level of assurance noting that different components may be evaluated at different levels of assurance). If the output of the test is no, then steps E2-E4 are repeated whereas, if it is yes, then the final architecture of the gateway 1 is determined in step E5. The resulting gateway 1 is thus an efficient combination of simple elementary modules such as for example components 111-173 easy to evaluate and hosted on a virtualization platform.

It is to be noted that the elementary components 111-173 can be developed and certified independently of each other and thus, the gateway 1 can be updated at any time by introducing new elementary components. An update of one or more components of the gateway may be triggered by events such as the detection of a potential vulnerability of an elementary component, the modification of the function of an existing component (e.g. modification of security rules to be applied by a given component), or the addition of new components enhancing the overall gateway function (for example, adding the processing of a data flow for a new application-level protocol).

Figure 3:
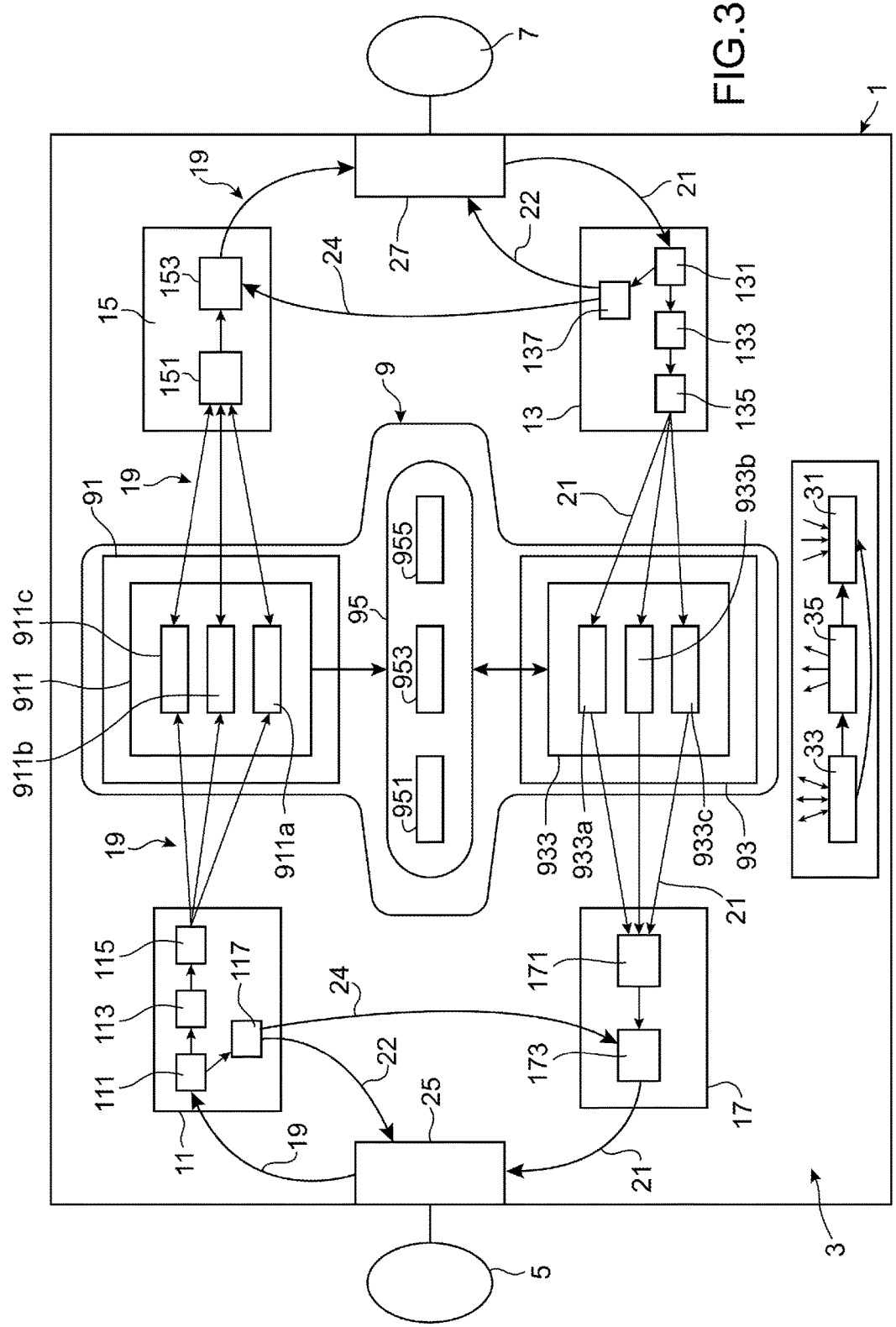
FIG. 3 schematically illustrates a gateway adapted to interconnect first and second domains with different security levels according to a first embodiment of the invention.

FIG. 3 schematically illustrates a gateway adapted to interconnect first and second domains with different security levels according to a first embodiment of the invention.

According to this embodiment, the first domain 5 is characterized by a security level higher than that of the second domain 7. From a security point of view, this means that the assets of the first domain 5 are considered as much more important and more valuable than those of the second domain 7. The assets of a given domain are the applications, functions or data hosted by that domain. Obviously, the comparison between the security levels of the two domains 5, 7 is simple when both of them belong to the same infrastructure (an aircraft, a satellite, a boat or a vehicle) which is normally the case.

The gateway 1 is hosted by a virtualization platform 3 and is configured to authorize secure bidirectional flow of data along two different and independent (unidirectional) paths 19, 21 between the first and second domains 5, 7. In particular, the gateway 1 has to ensure that during the communication between the two domains 5, 7, the security of the first domain 5 is not damaged by potential threats that may be initiated by the second domain 7 which is characterized by a lower security level. Thus, in a first place, the integrity and availability of assets located in the first domain 5 has to be protected by the gateway 1 and only in a second place, is considered the availability of the communication between the two domains 5, 7.

The example of FIG. 3 shows that the gateway 1 comprises an analyzing bloc 9 of elementary components 911a-933c, first and second receiving blocs 11, 13 of elementary components 111-117 and 131-137, first and second transmitting blocs 15, 17 of elementary components 151-153 and 171-173, and first and second network interface cards NIC (or components) 25, 27. All elements (i.e., elementary components and network interface components) are well defined and communicate with each other or with the underlying virtualization platform according to a well-defined Application Programming Interface (API) that clearly specifies the interaction between these elements. For example, in an avionic environment, the API can be a subset of an ARINC 653 or an AFDX standard.

Each elementary component can be implemented in one or several partitions provided by the virtualization platform of a MILS type hosting all partitions simultaneously.

The entry ends of the gateway 1 are the first and second network interface components 25, 27 configured to communicate with the first and second domains 5, 7 respectively. The first network interface component 25 is connected to the first receiving bloc 11 and to the second transmitting bloc 17. The second network interface component 27 is connected to the second receiving bloc 13 and to the first transmitting bloc 15.

The first and second receiving blocs 11, 13 are configured to respectively receive data from the first and second domains 5, 7 along the first and second paths 19, 21 and to analyze each received data at a network security level.

In particular, the first receiving bloc 11 comprises a first elementary stack receiver component 111, a first elementary flow security receiver component 113, a first elementary flow dispatch receiver component 115 and a first communication manager receiver component 117.

The first elementary stack receiver component 111 is configured to process an incoming flow of data frames from the first domain 5 by disassembling each data frame into separate data fields forming a flow of data fields along the first path 19.

The first communication manager receiver component 117 is configured to manage acknowledgement messages. Indeed, it is adapted to either send back to the interface component 25 the acknowledgement for the received packet (arrow 22) or to send the received acknowledgement to the stack transmitter component 173 (arrow 24).

The first elementary flow security receiver component 113 is configured to receive the flow of data fields from the first elementary stack receiver component 111, to copy useful fields necessary for addressing the communication partners into an internal structure (not shown) and to apply network security rules onto these useful fields. The network security rules comprise rules for checking that, for example, the destination and/or source of the data fields is authorized, rules for checking that there are no malformed fields at the network level, as well as other network rules.

The first elementary flow dispatch receiver component 115 is configured to receive the useful fields and to implement on them preliminary application-level security rules before sending them to the analyzing bloc 9.

Similarly, the second receiving bloc 13 comprises a second elementary stack receiver component 131, a second elementary flow security receiver component 133, a second elementary flow dispatch receiver component 135 and a second communication manager receiver component 137. All these components have equivalent functions to those in the first receiving bloc 11 but with respect to the second interface component 27.

The analyzing bloc 9 comprises first and second sets of elementary controlling components 91, 93 and a set of associated elementary stateful context components 95 (951, 953, 955). Three elementary components of each set are illustrated just as an example and of course the number of components is not limited and depends on the overall gateway function.

The first set of elementary controlling components 91 comprises a first set of elementary observing components 911 (911*a*-911*c*) configured to gather information on data flowing along the first path 19 (i.e., from the first domain 5 to the second domain 7) and to transmit it to the associated set of stateful context components 951-955 which is configured to store the information. Each elementary observing component (911*a*-911*c*) corresponds to a predetermined application-level protocol. Advantageously, an elementary observing component 911*a*-911*c* can be further decomposed into a set of elementary observing subcomponents (not shown).

The second set of elementary controlling components 93 comprises a second set of associated elementary filtering components 933 (933*a*-933*c*) configured to implement a series of strong application security rules before allowing or disallowing the flow of data from the second domain 7 towards the first domain 5 along the second path 21. Each elementary filtering component (933*a*-933*c*) corresponds to a predetermined application-level protocol. The series of application security rules comprises first consulting rules intended to consult the information stored in the associated set of stateful context components 951-955. Advantageously, one or more elementary filtering components 933*a*-933*c* can be composed of a set of elementary filtering subcomponents (not shown) connected to each other in series, each elementary filtering subcomponent implementing a subset of the application security rules. For example, each elementary filtering subcomponent is adapted to take a decision on a given level of the application protocol and is adapted to interact with the corresponding stateful context component 951-955. Thus, a data flow is allowed to cross the gateway 1, only if it is authorized by all the elementary filtering subcomponents part of the associated elementary filtering component 933*a*-933*c*.

Advantageously, a diversification methodology can be used for increasing the level of confidence in an elementary filtering component 933*a*-933*c*.

Figure 4A:
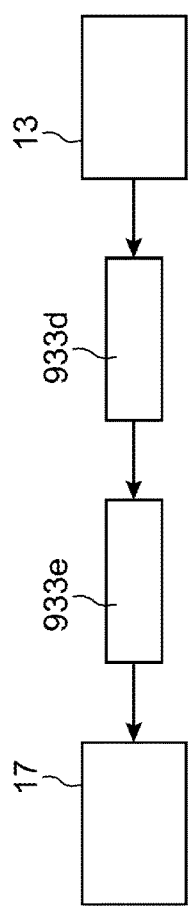
FIGS. 4A and 4B schematically illustrate different configurations of elementary filtering components, according to different embodiments of the invention.
Figure 4B:
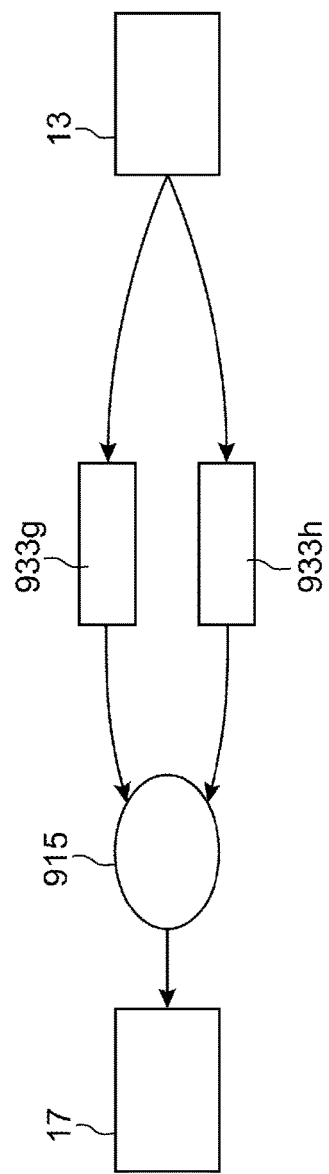

Indeed, FIGS. 4A and 4B schematically illustrate different configurations of elementary filtering components, according to different embodiments of the invention.

For example, for a given application protocol, the function of an elementary filtering component can be implemented into two or more elementary filtering components connected in series or in parallel.

The example of FIG. 4A shows first and second elementary filtering components 933*d*, 933*e* defining two different implementations of the same function connected in series. It is clear that the second elementary filtering component 933*e* starts analyzing the data flow only if it has already been authorized by the first elementary filtering component 933*d*.

More generally, the set of associated elementary filtering components may comprise a plurality of subsets of elementary filtering components, each subset being composed of two or more elementary filtering components connected to each other in series.

The example of FIG. 4B shows two elementary filtering components 933*g*, 933*h* defining two different implementations of the same function connected in parallel. In that case, an elementary voter component 915 is needed to compare the outputs of the two elementary filtering components 933*g* and 933*h*. In order to protect the integrity of the destination domain 5, the elementary voter component 915 forwards the data flow only if it has been authorized by both elementary filtering components 933*g*, 933*h*.

More generally, the set of associated elementary filtering components 933 may comprise a plurality of subsets of elementary filtering components, each subset being composed of two or more elementary filtering components connected to each other in parallel and the outputs of said parallel elementary filtering components being connected to an elementary voter component.

As a variant, the elementary voter component 915 comprises a reference model defining authorized requests. The output of each elementary filtering component 933*g*, 933*h* is thus compared to the reference model and the data flow is forwarded to the transmitting bloc 17 only if a perfect match has been found. This embodiment increases the integrity protection and level of trust in case a flow of data has been fraudulently authorized by two corrupted elementary filtering components that should have normally prohibited the flow of that data.

Also in another embodiment, the elementary voter component 915 is configured to directly forward the flow of data when at least one of the two elementary filtering components 933*g*, 933*h* has answered. This enables to increase the overall availability of the gateway 1 by temporarily masking latency problems or failures of some components.

It is to be noted that the parallel configuration of FIG. 4B provides more efficient CPU utilization due to the fact that the gateway architecture is based on a virtualization platform using static scheduling of partitions in the preferred embodiment. In other embodiments, dynamic scheduling may be used.

In other respects, the first transmitting bloc 15 comprises a first elementary flow transmitter component 151 and a first elementary stack transmitter component 153.

The first elementary flow transmitter component 151 is configured to gather data fields from the corresponding elementary controlling components 91 and to assemble the different data fields into data frames.

Furthermore, the first elementary stack transmitter component 153 is configured to receive the data frames from the first elementary flow transmitter component 151 and to send them to the second domain 7 via the second network interface component 27. The stack transmitter component 153 also manages the communication at network level by processing acknowledgements of previously transmitted packets sent by the target domain and forwarded from the second communication manager 137 (arrow 24).

Similarly, the second transmitting bloc 17 comprises a second elementary flow transmitter component 171 and a second elementary stack transmitter component 173. These components 171, 173 are equivalent to those in the first transmitting bloc 15 but with respect to the first network interface component 25.

Advantageously, the decomposition of the gateway 1 into elementary components (each having a precise and simple function enforcing its correct and secured implementation locally), allows identifying their level of security. In other words, the level of security needed for each of these elementary components is easily determined with respect to its locally implemented function. These code security levels can be classified into four categories consisting of a "high security level," a "medium security level," a "low security level" and finally a "not necessarily trusted." A component presenting a "high security level" means that its implementation is correct and effective (with respect to a good specification), exempt of malicious code and, ideally exempt of vulnerabilities. As zero vulnerability goals for a piece of software is almost impossible to achieve, the implementation has to prove that known vulnerabilities are impossible to be exploited.

The other security levels ("medium security level," "low security level" and "not necessarily trusted") are defined according to the number of missing characteristics with respect to the "high security level." Nevertheless, for all these levels it has to be certified that the implementation of each elementary component presents no malicious code. However, the code correctness and invulnerability are more or less guaranteed in function of the security level.

Certainly, the "high security level" is attributed to the elementary components of the analyzing bloc 9 knowing that the first domain's integrity relies primarily on them. Indeed, the elementary observing components 911*a*-911*c*, the elementary stateful context components 951-955 and the elementary filtering components 933*a*-933*c* are configured to implement the main security rules at an application-protocol level on the data exchanged between the first and second domains 5, 7. These elementary components (911*a*-911*c*, 951-955, 933*a*-933*c*) are thus correctly and effectively implemented with respect to a high standard specification and are exempt of malicious code and known vulnerabilities.

However, the network interface components 25, 27, the elementary flow security receiver components 113, 133 and the elementary flow dispatch receiver components 115, 135 can be categorized in the "low security level" as they have a less important role in the data flow analysis than the analysis bloc 9.

Finally, the elementary stack receiver components 111, 131, the manager receiver components 117, 137, the elementary flow transmitter components 151, 171 and the elementary stack transmitter components 153, 173 can be categorized as "not necessarily trusted." Indeed the elementary stack receiver components 111, 131 are almost the first entry points of the gateway 1 and thus, it can be considered that an external malicious data may succeed in attacking them but, thanks to the high security level components, the attack would not be able to propagate through the gateway 1 into the other end. The flow transmitter components 151, 171 and the elementary stack transmitter components 153, 173 do not apply any security rules on the data flow and their roles are restricted to preparing and sending the data flow via the network interface components 25, 27. Indeed, if a highly improbable malicious data flow succeeds in arriving into these transmitter components, it would already be too late to stop the attack.

Advantageously, the gateway 1 further comprises an audit component 31, a monitoring component 33 and a self-testing component 35. These components are not involved in processing the data flow between the first and second domains 5, 7 but they have the role of supervising the correct functioning of the gateway 1 itself during its lifespan.

In particular, the audit component 31 is configured to gather audit logs from all other elementary components for forensic analysis. The monitoring component 33 is configured to health monitor all sets of elementary components and to take decisions in case anomalies, failures or unusual behaviors are detected. Finally, the self-testing component 35 is configured to test elementary components by injecting test data. Its role is to test the correct performance of the elementary components during a security check. The self-testing component 35 works in collaboration with the monitoring component 33 for self-testing the gateway elementary components when of course there is no data flow initiated by anyone of the first and second domains 5, 7.

Advantageously, the audit, monitoring and self-testing components 31-35 are hosted by the virtualization platform preventing thus any interference between these components in an embedded environment.

The audit component 31 can be categorized in the "low security level" as its role of gathering logs from all other components is considered to be passive. In contrast, a "medium security level" can be attributed to the monitoring and self-testing components 33, 35 which have more active roles but of course less than the analyzing bloc 9. In fact, any misbehavior of these components will be detected by the analyzing bloc 9 which will directly reject any malformed or malicious data initiated by them. In particular, a malicious data may only come from the self-testing component 35 knowing that the interaction of the monitoring component 33 with any other component cannot be considered as malicious. However, superfluous self-testing activities may potentially be wrongly initiated by a command from the monitoring component 33. Nevertheless, the analyzing bloc 9 of high security level components behaves always as expected no matter whether the malicious data comes from the second domain 7 or from the self-testing component 35.

It should be noted that the components forming the gateway 1 can be structured into different domains or groups. The belonging of a component to a group depends on whether the data crossing that component undergoes or not any security checks on an application-level. The components of the first network interface 25 along with the first receiving bloc 11 and the second transmitting bloc 17 are part of a high security group. In contrast, the components of the second network interface 27, the second receiving bloc 13 and the first transmitting bloc 15 are part of a low security group. The elementary components responsible for analyzing the data flow (i.e., the elementary components of the analyzing bloc 9) belong to a security critical group. These elementary components are configured to implement strong security rules during exchange of data. They are used as validation objects for the data flow and, by their function, are changing the security level of the data from one end of the gateway 1 to the other.

Finally, the audit 31, monitoring 33 and self-testing 35 components make part of a third group responsible for the internal well-functioning of the gateway 1.

Advantageously, this partition of components into different groups enables to clearly define the boundaries with respect to the security critical group containing a small set of well identified elementary components that are the only ones allowed to downgrade or upgrade the security level of the data flow.

In other respects, it is to be noted that the first objective of the gateway 1 is to protect the domain of high security level (i.e. first domain 5) against any data corruption attempt or any attack on the system's integrity. Once the integrity is guaranteed, the second objective is to protect the availability of that domain. Finally, once the first two objectives are achieved, the third objective is to fulfil the gateway's ordinary function consisting of allowing communication between the two domains 5, 7. The order of these objectives illustrates their respective importance and thus a communication between two domains is easily laid down in order to preserve the integrity of the high security domain.

Hereafter is given an example to illustrate the steps of data exchange between the first and second domains 5, 7 with reference to the gateway architecture of FIG. 3.

It is supposed that a first application in the first domain 5 sends a request message to a second application located in the second domain 7 asking for a given file and that the latter responds to that request after receiving the message.

When the request from the first domain 5 is received at the first network interface component 25, the flow of data corresponding to that request is transmitted by the latter to the first elementary stack receiver component 111. The first communication manager receiver component 117 sends an acknowledgement message to the first network interface component 25 while the incoming flow of data is processed by the first elementary stack receiver component 111 according to a given protocol (for example UDP/IP or TCP/IP). The first elementary stack receiver component 111 disassembles each data frame into separate data fields which are then sent to the first elementary flow security receiver component 113. The flow of data fields are gathered by the first elementary flow security receiver component 113. In particular, this component builds the data flow internally based on the received packets by copying the important fields of data. Thus, any malicious attack present in an unused packet field is eliminated. Moreover, network security rules are applied on the copied useful fields. Advantageously, each rule may be implemented by an elementary subcomponent (not shown) of the first elementary flow security receiver component. These network security rules enable for example to eliminate unauthorized destinations and/or sources as well as malformed fields at the network level according to an Open System Interconnection (OSI) model. Of course, other network security checks may also be conducted.

Once the useful flow of data fields is authorized at the network level, it is sent to the first elementary flow dispatch receiver component 115 which applies preliminary applicative security rules for analyzing the application level protocol. If the protocol is authorized, then the data flow is sent to one of the elementary observing components 911a-911c (for example, 911a) in function of the associated application-level protocol. Advantageously, before sending the data flow, the activity of the elementary observing component 911a is checked by the monitoring component 33. Indeed, if the elementary observing component 911a has been detected to be non-active, then it is disabled and does not receive any data.

Given that the gateway 1 of this first embodiment is intended to protect the integrity of the first domain 5 which is not malicious and is guaranteed to be a trusted source, then the data flow from this domain into the second domain 7 does not need to be strongly analyzed from the security point of view. Thus, the flow of data fields can be transmitted without further analysis to the first elementary flow transmitter component 151. However, the role of each elementary observing component (911a-911c) comprises gathering communication details and sending them to an associated stateful context component (951-955) so that the latter can be consulted by a corresponding elementary filtering component (933a-933c) in the opposite direction via the second path 21 of communication. For example, the elementary observing component 911a notes in the corresponding stateful context component 951 details about the request made by the first domain 5 concerning a given file.

Then, the first elementary flow transmitter component 151 gathers data fields from all the elementary observing components 911a-911c. It assembles the different data fields into data frames before sending them to the first elementary stack transmitter component 153 which in its turn send them to the second domain 7 via the second network interface component 27.

In the opposite direction (i.e., for the flow of data from the second domain 7 to the first domain 5 along the second path 21), the second receiving 13 and transmitting 17 blocs perform steps similar to those of the first receiving 11 and transmitting 15 blocs.

Indeed, when the response message sent by the second domain 7 is received at the second network interface 27, the flow of data corresponding to that response is transmitted to one of the second set of associated elementary filtering components 933a-933c (for example, 933a) in function of the associated application-level protocol via the second receiving bloc 13. The response message undergoes operations conducted by the elementary components of the second receiving bloc 13 equivalent to those of the corresponding components of the first receiving bloc 11. Advantageously, the validity of each elementary filtering component (933a-933c) is also checked before it is allowed to receive the response data.

The second domain 7 is considered to be less trustful than the first domain 5 and potentially it might generate malicious data flows. Therefore, in order to protect the integrity of the first domain 5 the data flow coming from the second domain 7 is strongly analyzed by the second set of elementary filtering components 933a-933c. Indeed, for each application-level protocol the current data fields are checked by a series of rules, each rule would be applied to one or more frames. If only one of these rules is not respected, then the current flow of data fields is rejected or dropped.

At least one of the rules comprises consulting the corresponding stateful context component (951-955) so as to be sure that only authorized requests containing correct data are permitted. For example, if the answering message coming from the second domain 7 contains a given file, in that case the elementary filtering component 933a consults the corresponding stateful context component 951 to check whether that file was previously requested by the first domain 5 and if it was not requested, then the answering message would be simply rejected or dropped. It should be noted that in addition to consulting the stateful context components 951-955, the elementary filtering components 933a-933c implement strong security rules at application protocol level as it is the key point to protect the high security of the first domain 5 from wrong or malicious data received from the low security second domain 7.

Once the answering message is authorized by the corresponding application-level component of the second set of elementary filtering components 933a-933c, it is sent to the components of the second transmitting bloc 17 which process the data in the same manner as those of the first transmitting bloc 15 before sending it to the first domain 5 via the first network interface component 25.

The above example concerned a method authorizing bidirectional communication between a first domain 5 of high security level and a second domain 7 of low security level. It is evident that this method can be extended to the case where the first domain 5 also communicates with a third domain (not shown) having a lower security level. The elementary components as those depicted in FIG. 3 can be used to implement the bidirectional communication with the third domain. Indeed, the same elementary components can be used or duplicated to enable a bidirectional communication between high security level domains and low security level domains.

Moreover, by providing elementary observing and filtering components in both opposite directions, a bidirectional communication between two domains having the same security levels can be achieved. Indeed, two domains may both have high security levels without necessarily trusting each other for different reasons. For example, the communication between them may cross non trusted domains.

Figure 5:
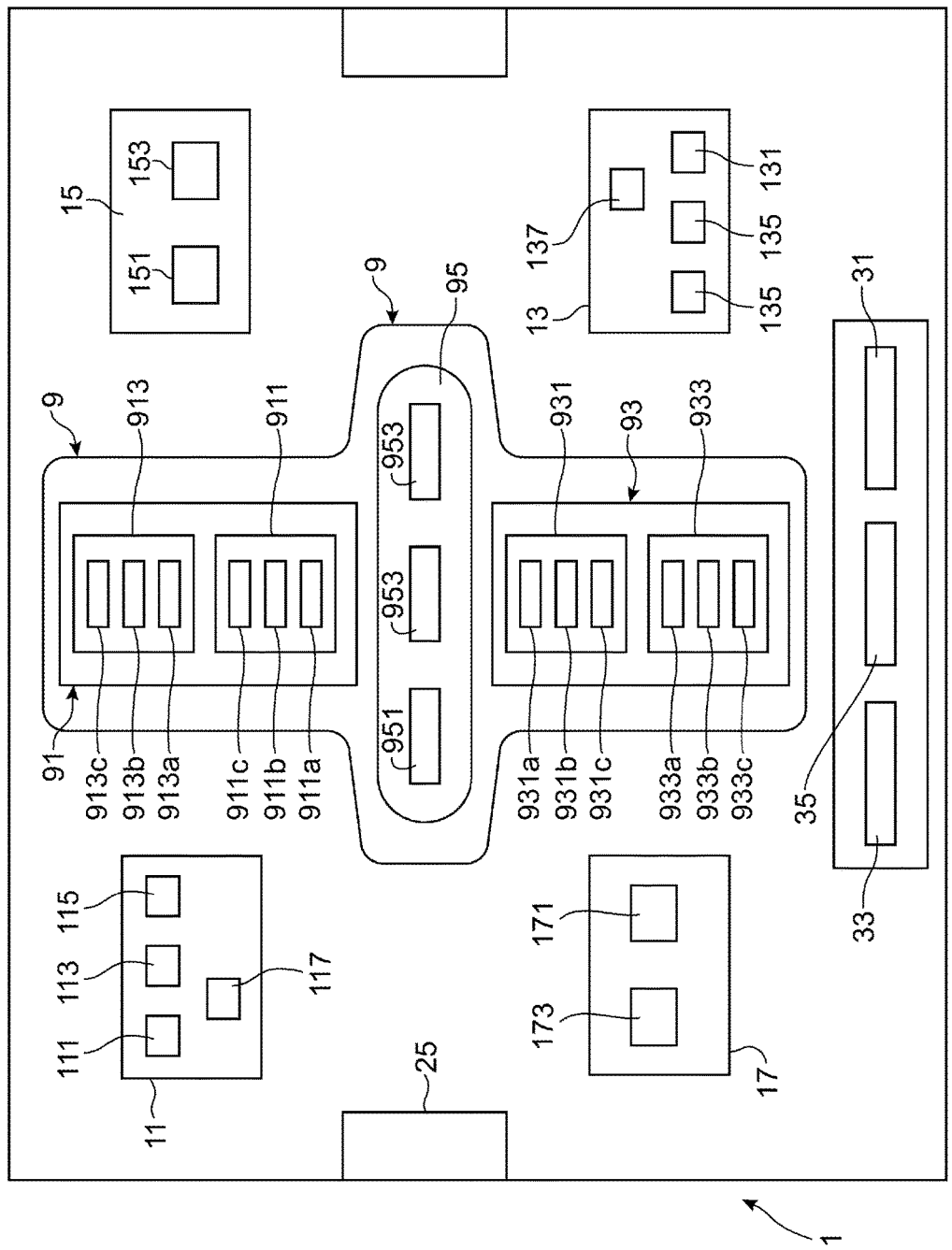
FIG. 5 schematically illustrates a gateway adapted to interconnect first and second domains according to a second embodiment of the invention.

FIG. 5 schematically illustrates a gateway 1 adapted to interconnect first and second domains 5, 7 according to a second embodiment of the invention.

The two domains 5, 7 may have the same or different security levels.

The gateway 1 according to this embodiment is the same as that of FIG. 3 except that the analyzing bloc 9 comprises equivalent elementary components along the two different paths.

Indeed, the analyzing bloc 9 comprises first and second sets of elementary controlling components 91, 93 and a set of associated elementary stateful context components 95. The first set of elementary controlling components 91 comprises a first set of elementary observing components 911a-911c and a first set of elementary filtering components 913a-913c. The second set of elementary controlling components 93 comprises a second set of elementary observing components 931a-931c and a second set of elementary filtering components 933a-933c.

In particular, the second set of elementary observing components 931a-931c are configured to gather information on data flowing along the second path 21 (i.e., from the second domain 7 to the first domain 5) and to transmit it to the associated set of stateful context components 951-955. The first set of elementary filtering components 913a-913c are configured to implement a series of application-level security rules comprising second consulting rules intended to consult the information stored in said associated set of stateful context components.

The gateway architecture according to the present invention allows most of its components and elementary components to be developed independently of each other. Each elementary component has a well-defined role and specified interfaces with the other elementary components. Each elementary component is designed to have a very small number of functions such that its implementation is easily done and easily verified. Thus, the gateway can be considered as made up of a set of modules (i.e., elementary components) and new modules can be added at any time.

In particular, the modules or elementary components of the analyzing bloc 9 are completely independent from the other elementary components of the gateway. Thus, any new application-level function can be implemented into a partition or several partitions corresponding to a new elementary component that can be easily introduced in the gateway. It is only needed to define the associated protocol of the application-level filtering function in the configuration of the elementary flow dispatch components so as to be recognized and to provide inter-partition communication with the one or ones implementing the new application-level filtering function. The elementary application-level filtering components are also independent from each other. Indeed, a filtering of one protocol does not interfere in any way with a filtering of another protocol. Thus, the development of an application-level filtering can be done at any moment and independently of any other component's development. Its integration into the gateway is very simple and its certification can also be done independently. Thus, the gateway can be updated and its functions enhanced throughout its lifetime. Indeed, by using incremental and independent certification methodologies, the modification of an existing component or the integration of new components certified independently allow the gateway to be easily updated without starting from scratch.

The gateway architecture has been described by focusing on the integrity aspects concerning the protection of a domain's assets. However, the same gateway architecture can be equally used to protect availability, and/or confidentiality and/or non-repudiation.

It is noted that elementary components 11, 13, 15, 17 could contain encryption/decryption functionalities.

The gateway according to the present invention is advantageously used in an embedded infrastructure. In particular, it is adapted to be used in an aircraft communication system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A gateway using a virtualization platform and adapted to interconnect different domains, comprising:
   one or more hardware processing units; and
   a plurality of sets of one or more partitions hosted on the virtualization platform configured to authorize secure bidirectional flow of data along two different and unidirectional paths between first and second domains,
   each of the one or more partitions in said plurality of sets being decomposed into and comprising a plurality of subsets of elementary components of code comprising a plurality of lines of code that are executable by said one or more hardware processing units, each of said elementary components of code having a specified function and being adapted to communicate with other predefined said elementary components of code, wherein said plurality of sets of one or more partitions comprises:
- a first set and a second set of one or more partitions configured to respectively receive data from said first and second domains along first and second paths and to analyze each received data at a network security level,
- a third set and a fourth set of of one or more partitions configured to respectively transmit data to said second and first domains along said first and second paths,
- a fifth set of one or more partitions configured to analyze and implement a series of security rules at an application protocol level on data flowing along at least one path to ensure that no malicious or unauthorized data is flowing along that at least one path;

wherein along the first path from the first domain to the second domain the firth set of one or more partitions is disposed for flow of data between the first set of one or more partitions and the third set of one or more partitions, and wherein along the second path from the second domain to the first domain the fifth set of one or more partitions is disposed for flow of data between the second set of one or more partitions and the fourth set of one or more partitions;

wherein the gateway further comprises:
- a first network interface connected to the first set of one or more partitions and to the fourth set of one or more partitions, said first network interface being configured to communicate with the first domain, and
- a second network interface connected to the second set of one or more partitions and to the third set of one or more partitions, said second network interface being configured to communicate with the second domain.

2. The gateway according to claim 1, wherein
said fifth set of one or more partitions comprises first, second, and third subsets of partitions,
- said first subset of partitions being configured to gather information on data flowing along said first path and to transmit it to the associated third subsets of partitions which are configured to store said information, and
- said second subset of partitions being configured to implement a first series of application-level security rules before allowing or disallowing the flow of data from the second domain towards the first domain along the second path,
- said first series of application-level security rules comprising first consulting rules intended to consult the information stored in said associated third subset of partitions.

3. The gateway according to claim 2, wherein
said second subset of partitions being further configured to gather information on data flowing along said second path and to transmit it to the associated third subset of partitions, and wherein
said first subset of partitions being further configured to implement a second series of application-level security rules comprising second consulting rules intended to consult the information stored in said third subset of partitions.

4. The gateway according to claim 2, wherein at least one of said first subset of partitions is composed of a set of partitions connected to each other in series.

5. The gateway according to claim 2, wherein at least one of said second subset of partitions is composed of a set of partitions connected to each other in series.

6. The gateway according to claim 2, wherein at least one of said first and second subsets of partitions is composed of two or more partitions connected to each other in parallel.

7. The gateway according to claim 2, wherein said third and fourth sets of one more partitions comprise:
- fourth and fifth subsets of partitions respectively configured to gather data fields from the corresponding first and second subsets of partitions and to assemble the data fields into data frames,
- sixth and seventh subsets of partitions respectively configured to receive the data frames from said third and fourth sets of one or more partitions respectively and to send them to the second and first domains respectively.

8. The gateway according to claim 1, wherein said first and second plurality of sets of one or more partitions comprise:
- first and second subsets of partitions respectively configured to process an incoming flow of data frames from first and second domains respectively by disassembling each data frame into separate data fields forming a flow of data fields,
- third and fourth subsets of partitions respectively configured to receive said flow of data fields and to copy useful fields into an internal structure before applying network security rules onto said useful fields, and
- fifth and sixth subsets of partitions respectively configured to receive said useful fields and to implement on them preliminary application-level security rules before sending them to said fifth set of one or more partitions.

9. The gateway according to claim 8, wherein said network security rules comprise:
- rules for checking that at least one of the destination and the source of the data fields is authorized, and
- rules for checking that there are no malformed fields at the network level.

10. An embedded infrastructure comprising said gateway according to claim 1.

11. An aircraft communication system comprising said gateway according to claim 1.

12. A method for constructing a gateway using a virtualization platform, of MILS type, and adapted to interconnect different domains with different security levels, comprising the steps:
defining a plurality of sets of one or more partitions hosted on the virtualization platform configured to authorize secure bidirectional flow of data along two different and unidirectional paths between two different domains, wherein said set of functional blocs comprises:
- a first set and a second set of one or more partitions configured to respectively receive data from said first and second domains along first and second paths and to analyze each received data at a network security level,
- a third set and a fourth set of one or more partitions configured to respectively transmit data to said second and first domains along said first and second paths, and
- a fifth set of one or more partitions configured to analyze and implement a series of security rules at an application protocol level on data flowing along at least one path to ensure that no malicious or unauthorized data is flowing along that at least one path, wherein along the first path from the first domain to the second domain the fifth set of one or more partitions is disposed for flow of data between the first set of one or more partitions and the third set of one or more partitions, and wherein along the second path from the second domain to the first domain the fifth set of one or more partitions is disposed for flow of data between the second set of one or more partitions and the fourth set of one or more partitions, and decomposing said plurality of sets of one or more partitions in an iterative way into a plurality of subsets of elementary components of code comprising a plurality of lines of code that are executable by one or more hardware processing units, each subset of elementary components of code having a specified function and being allowed to communicate with other predefined elementary components of code, wherein the first path is disposed for flow of data between, in order, the first domain, the first set of one or more partitions, the fifth set of one or more partitions, the third set of one or more partitions, and the second domain, without passing through the fourth set of one or more partitions; and wherein the second path is disposed for flow of data between, in order, the second domain, the second set of one or more partitions, the fifth set of one or more partitions, the fourth set of one or more partitions, and the first domain, without passing through the third set of one or more partitions.

\* \* \* \* \*